(12) United States Patent
Kandula et al.

(10) Patent No.: US 10,536,359 B2
(45) Date of Patent: Jan. 14, 2020

(54) OPTIMIZED PERFORMANCE DATA COLLECTION AT CLIENT NODES

(71) Applicant: VMWARE, INC., Palo Alto, CA (US)

(72) Inventors: Srinivas Kandula, Bangalore (IN); Padmini Sampige Thirumalachar, Bangalore (IN); Gangadharaswamy Hindiskere Umapathi, Bangalore (IN); Aditya Choudhary, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 92 days.

(21) Appl. No.: 15/949,081

(22) Filed: Apr. 10, 2018

(65) Prior Publication Data

US 2019/0312801 A1    Oct. 10, 2019

(51) Int. Cl.
| | |
|---|---|
| *G06F 9/455* | (2018.01) |
| *H04L 12/26* | (2006.01) |
| *H04L 29/06* | (2006.01) |
| *G06F 9/50* | (2006.01) |
| *G06F 7/08* | (2006.01) |
| *H04L 29/08* | (2006.01) |

(52) U.S. Cl.
CPC ........... *H04L 43/0876* (2013.01); *G06F 7/08* (2013.01); *G06F 9/5044* (2013.01); *H04L 67/42* (2013.01); *H04L 67/10* (2013.01)

(58) Field of Classification Search
CPC .............. G06F 9/3855; G06F 9/4558; G06F 17/30424; G06F 11/301; G06F 9/4881; G06F 9/461; H04L 67/1065
See application file for complete search history.

(56) References Cited

U.S. PATENT DOCUMENTS

| | | | |
|---|---|---|---|
| 2012/0185862 A1* | 7/2012 | Arcese | G06F 9/4881 718/103 |
| 2014/0237069 A1* | 8/2014 | Gray | G06F 3/061 709/214 |
| 2018/0349146 A1* | 12/2018 | Iwamoto | G06F 9/4881 |

* cited by examiner

*Primary Examiner* — Kim T Nguyen

(57) ABSTRACT

Techniques for optimized performance data collection at client nodes are disclosed. In one embodiment, a client node in a client-server environment may include at least one processing resource and a computer-readable storage medium having computer-readable program code embodied therewith. The computer-readable program code being configured to obtain resource utilization data associated with a plurality of processes running on the client node, determine a list of processes having resource utilization greater than a threshold based on the resource utilization data, organize the list of processes based on predetermined criteria and the resource utilization data, generate a report including a predefined number of processes from the organized list, and transmit the report to a management node for performance monitoring.

25 Claims, 5 Drawing Sheets

OPTIMIZED PERFORMANCE DATA COLLECTION AT CLIENT NODES

TECHNICAL FIELD

The present disclosure relates to client-server systems, and more particularly to methods, techniques, and systems for optimized performance monitoring of client nodes in client-server systems.

BACKGROUND

In application/operating system (OS) monitoring environments or client-server environments, a server, a group of servers or a cluster of servers may communicate with multiple clients. For example, clients may include virtual machines (VMs), Internet of Things (IoT) gateways, cross cloud infra, computing devices, and the like. In client-server environments, a server may communicate with multiple clients, with each client having an agent to collect performance data/metrics from underlying OS and/or services on the client and report the data to the server for storage and performance analysis.

Further, resource such as a central processing unit (CPU), memory, input/output (I/O), network and the like, may play a role in troubleshooting any performance related issues. Each OS vendor may have different mechanisms/options to obtain the performance data associated with such resources. In some mechanisms, a command may need to be run on the clients separately for each of the parameters, with different options. For example, the command may list the processes based on CPU usage as a default parameter. In such cases, the command may need to be run separately to get the data based on memory, I/O, and other parameters. Further, the data of the clients may be sent to a centralized server, which may be tasked with collating and computing the data, storing the data, and then using the data to generate relevant user interface (UI) reports. In such cases, the task of collating and computing the data may consume significant compute and storage resources on the server.

Figure 1:
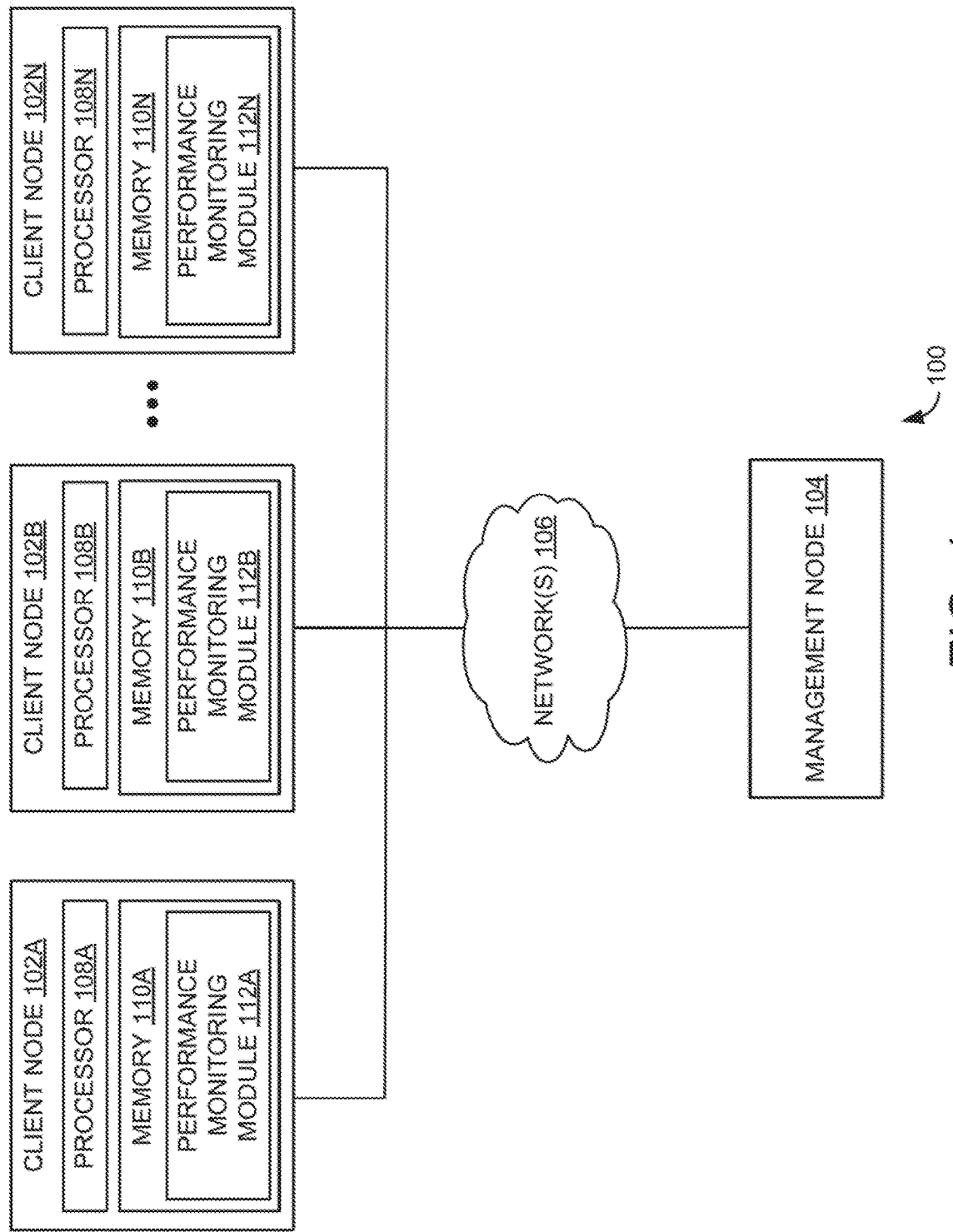
FIG. 1 is a system view of an example client-server environment illustrating a client-side performance monitoring module to optimize and transmit performance data to a management node.

The drawings described herein are for illustration purposes only and are not intended to limit the scope of the present subject matter in any way.

DETAILED DESCRIPTION

Embodiments described herein may provide an enhanced computer-based and network-based method, technique, and system for optimizing and transmitting performance data to a server for performance monitoring. It is often desirable to measure performance metrics in client-server systems to obtain an understanding of how the systems are operating and identify performance, availability, and responsiveness issues within the systems. In client-server environments, a server may communicate with multiple clients, with each client having an agent to collect performance metrics from underlying OS and/or services on the client and report the data to the server for storage and analysis.

In cloud computing environments, administrators may use a command for troubleshooting performance issues of a client node, for example, to identify high resource consuming process. Further, the performance data of the client node may be sent to a centralized server, which can collate and compute the data, store the data and then use the data in the relevant user interface (UI) reports. However, the task of collating and computing the data may be cumbersome, for instance, in large scale environments.

For example, in cross cloud scenarios, where different VMs run on various types/flavors/versions of OS, the data (e.g., unformatted data) sent across may be in proprietary format, thereby leading to an additional task of collating and sorting at the server. This may consume significant amount of compute and storage resources on the server. Additionally, the unformatted data sent over network may add to an overhead of the network. The overhead of additional sorting on the server can make the server inefficient as there can be several VMs communicating to the server, thereby creating a bottleneck at the server.

Examples described herein may provide a client node that is communicatively coupled to a management node (i.e., server) in a client-server environment. The client node may include at least one processing resource and a computer-readable storage medium having computer-readable program code (e.g., performance monitoring module) embodied therewith. The computer-readable program code may obtain resource utilization data associated with a plurality of processes running on the client node, determine a list of processes having resource utilization greater than a threshold based on the resource utilization data, organize the list of processes based on predetermined criteria and the resource utilization data, and generate a report including a predefined number of processes from the organized list. Further, the computer-readable program code may transmit the report to the management node, via a network, for performance monitoring.

Examples described herein may enable the client nodes to generate the report in an OS agnostic manner, i.e., agnostic to a type/flavor/version of the OS. Examples described herein may facilitate client-side optimization and transmission of performance data to the management node, thereby delivering the performance data in a network friendly manner. Also, examples described herein may remove the additional overhead of computation and/or sorting the unformatted data on the management node (i.e., server), thereby reducing the compute and storage resource consumption on the management node. Thus, examples described herein may provide an elegant solution with no extra cost of resources (e.g., additional resources, servers, or external load balancers) to implement the functionalities described herein and associated maintenance.

System Overview and Examples of Operation

FIG. 1 is a system view of an example client-server environment 100 illustrating a client-side performance monitoring module 112 to optimize and transmit performance data to a management node 104. As shown in FIG. 1, client-server environment 100 may include client nodes 102A-N and management node 104 that is in communication with client nodes 102A-N over one or more networks 106. Each client node 102A-N may refer to a computing device or computer program (i.e., executing on a computing device) that requests services from management node 104.

Example client nodes 102A-N may include, but not limited to, physical computing devices, virtual machines, physical, gateway devices, virtual gateway devices, cross cloud infra, and the like. The virtual machines, in some embodiments, may operate with their own guest operating systems on a computing device using resources of the computing device virtualized by virtualization software (e.g., a hypervisor, virtual machine monitor, and the like). Client nodes 102A-N can be based on same OS or different OS. Management node 104 may refer to a computing device or computer program (i.e., executing on a computing device) that provides some service to client nodes 102A-N or client programs executing on client nodes 102A-N. Client nodes 102A-N and management node 104 may communicate over communication links (e.g., networks 106). Communication is according to a protocol, which may be a message-based protocol.

Example network 106 can be a managed Internet protocol (IP) network administered by a service provider. For example, network 106 may be implemented using wireless protocols and technologies, such as WiFi, WiMax, and the like. In other examples, network 106 can also be a packet-switched network such as a local area network, wide area network, metropolitan area network, Internet network, or other similar type of network environment. In yet other examples, network 106 may be a fixed wireless network, a wireless local area network (LAN), a wireless wide area network (WAN), a personal area network (PAN), a virtual private network (VPN), intranet or other suitable network system and includes equipment for receiving and transmitting signals. Network 106 can also have a hard-wired connection to client nodes 102A-N.

Further as shown in FIG. 1, client nodes 102A-N may include processing resources/processors 108A-N and memories 110A-N, respectively. Example processor can be any custom made or commercially available processor, a central processing unit (CPU), an auxiliary processor among several processors associated with client nodes 102A-N, a semiconductor-based microprocessor (in the form of a microchip or chip set, for example), a macroprocessor, or generally any device for executing computer-readable program code. Example memory 110 may be a computer-readable storage medium. In some examples, memory 110 can have a distributed architecture, where various components are situated remote from one another, but can be accessed by client nodes 102A-N. Processors 108A-N may be configured to execute software stored within associated one of memories 110A-N, to communicate data to and from the memory, and to generally control operations of client nodes 102A-N pursuant to the computer-readable program code. Example non-transitory computer readable medium is an electronic, magnetic, optical, or other physical device or means that can contain or store a computer program for use by or in connection with a computer related system. The computer-readable program code in the non-transitory computer-readable medium may include one or more separate programs, and may be in the form of a source program, executable program (object code), script, or any other entity comprising a set of instructions to be performed.

Examples described herein may be implemented in real time using software as the executable computer-readable program code in associated memories 110A-N executed by respective processors 108A-N. Examples described in FIG. 1 may depict management node 104 in communication with multiple client nodes 102A-N, however, in some examples, a group of management nodes or a cluster of management nodes can communicate with multiple client nodes 102A-N over one or more networks to provide services to client nodes 102A-N.

Each client node 102 may include a performance monitoring module 112 residing in associated memory 110. As shown in FIG. 1, client node 102A may include performance monitoring module 112A, client node 102B may include performance monitoring module 112B, and the like. Each performance monitoring module 112 may be a computer-readable program code that is configured to perform optimization and transmission of performance data to management node 104.

In one example, performance monitoring module 112A may obtain resource utilization data associated with a plurality of processes (e.g., software programs or applications) running on client node 102A, in real time. Example resource utilization data may be associated with at least one resource. The at least one resource is a hardware resource or a software resource. Example hardware resource may include a processor, a memory, a network hardware, a bandwidth, or the like. Example software resource may include an application program. Further, performance monitoring module 112A may determine a list of processes having resource utilization greater than a threshold based on the resource utilization data.

Furthermore, performance monitoring module 112A may organize the list of processes based on predetermined criteria and the resource utilization data. Also, performance monitoring module 112A may generate a report including a predefined number of processes from the organized list. For example, the predefined number may include a top "N" number of processes that consume high resource utilization in the list of processes.

In one example, performance monitoring module 112A may sort the list of processes based on the resource utilization, rank the sorted list of processes until the predefined number starting from a process with a high resource utilization, and generate the report including details associated with the predefined number of processes (i.e., top "N" processes) based on the ranked list of processes.

Further, performance monitoring module 112A may generate the report including the predefined number of processes in an OS agnostic manner. Then, performance monitoring module 112A may transmit the report to management node 104 for displaying or persisting. The report may be used by management node 104 for performance monitoring of client node 102A. Even though FIG. 1 is described with respect to one resource, resource utilization data can also be associated with a plurality of resources as explained with respect to FIG. 2.

Figure 2:
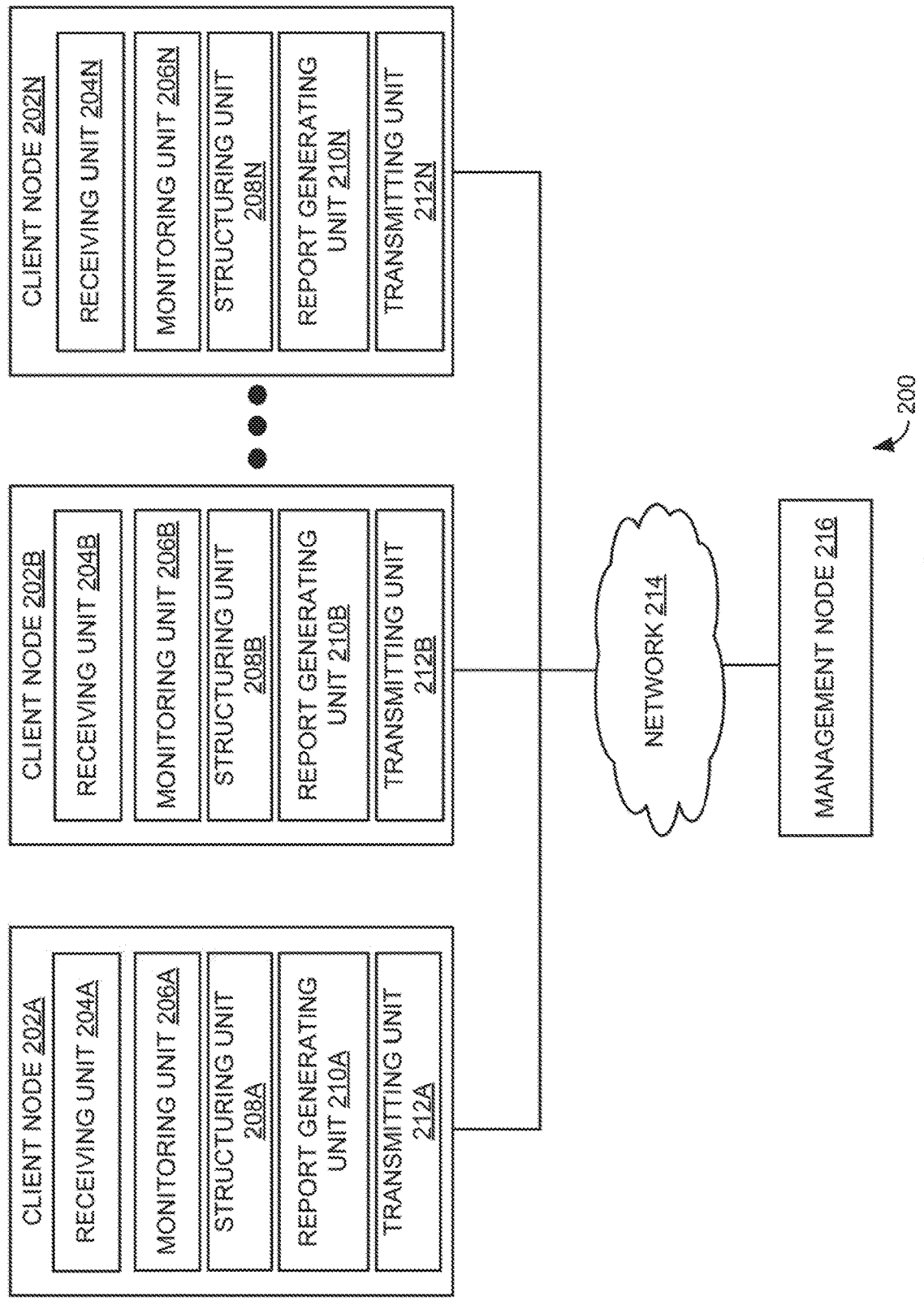
FIG. 2 is a block diagram of an example cloud computing system including a client node for generating a report including a top N number of processes.

FIG. 2 is a block diagram of an example cloud computing system 200 including client nodes 202A-N for generating a report including a top N number of processes. Cloud computing system 200 may be operated by a cloud computing service provider and exposed as a service available to tenants (e.g., account holders), such as enterprises. In some examples, cloud computing system 200 may be configured to dynamically provide an enterprise or users with one or more virtual data centers in which a user may provision VMs, deploy multi-tier applications on VMs, and/or execute workloads. Cloud computing system 200 may include an infrastructure platform upon which a cloud computing environment may be executed.

Cloud computing system 200 may include management node 216 and a plurality of client nodes 202A-N communicatively coupled to management node 216, for instance, via network 214. Example client nodes 202A-N may include, but not limited to, a physical computing device, a virtual machine, a physical gateway device, a virtual gateway device, and/or the like. In one example, client nodes 202-A-N may operate on different cloud computing environments or platforms in cloud computing system 200.

As shown in FIG. 2, client nodes 202A-N may include receiving units 204A-N, monitoring units 206A-N, structuring units 208A-N, report generating units 210A-N, and transmitting units 212A-N.

During operation, receiving unit 204 may receive a request from management node 216 to determine the predefined number of processes having high resource utilization. For example, the predefined number comprises a top "N" number of processes that consume high resource utilization corresponding to each of the resources. Monitoring units 206 may dynamically fetch resource utilization data for a plurality of processes running on client node 202. The resource utilization data may be associated with a plurality of resources. Example resource utilization data may include central processing unit (CPU) utilization, memory utilization, input/output (I/O) usage, cache usage, network bandwidth usage, and/or the like.

Further, structuring unit 208 may organize the plurality of processes corresponding to each of the resources based on predetermined criteria and the resource utilization data. In one example, structuring unit 208 may filter the resource utilization data to generate a list of processes having resource utilization for each resource greater than a threshold. Further, structuring unit 208 may sort the list of processes for each of the resources based on the resource utilization. Then, structuring unit 208 may rank the sorted list of processes for each of the resources until the predefined number starting from a process with a high resource utilization.

Furthermore, report generation unit 210 may generate a report including the predefined number of processes corresponding to each of the resources based on the organized processes, for example, using the ranked processes. In one example, report generation unit 210 may consolidate data associated with the predefined number of processes for the plurality of resources by removing duplicate entries of the processes and generate the report including the predefined number of processes based on the consolidated data. The report including the predefined number of processes can be OS agnostic.

Further, transmitting unit 212 may transmit the report to management node 216 for performance monitoring. In one example, transmitting unit 212 may transmit/send the report including consolidated data to management node 216 through a push or pull mechanism. In the pull mechanism, management node 216 may request and pull the information from client nodes 202A-N. In push mechanism, client nodes 202A-N may push the information to management node 216. For example, a management software in management node 216 may persist the report (i.e., consolidated data) for later viewing of the data by an admin of management node 216.

Thus, each client node 202A-N may receive a request for the top "N" resource consuming processes from management node 216, collect metrics associated with processes running therein, determine the top "N" resource consuming processes from the collected metrics, and generate and send the report including performance data associated with the top "N" resource consuming processes in a OS agnostic manner.

In one example, receiving units 204A-N, monitoring units 206A-N, structuring units 208A-N, report generating units 210A-N, and transmitting units 212A-N residing in client nodes 202A-N may be implemented as engines or modules comprising any combination of hardware, firmware, programming, or a combination thereof to implement the functionalities described herein. Management node 216 can be a service process in the management application or can be an appliance running in the data center to cater multiple management applications in a cloud-based environment. For example, management application may be vSphere virtual center that is offered by VMware. Management application can be provided in a physical server, VM, or container.

In some examples, the functionalities described herein, in relation to instructions to implement functions of receiving units 204A-N, monitoring units 206A-N, structuring units 208A-N, report generating units 210A-N, and transmitting units 212A-N and any additional instructions described herein in relation to the storage medium, may be implemented as engines or modules comprising any combination of hardware and programming to implement the functionalities of the modules or engines described herein. The functions of receiving units 204A-N, monitoring units 206A-N, structuring units 208A-N, report generating units 210A-N, and transmitting units 212A-N may also be implemented by respective processor. In examples described herein, the processor may include, for example, one processor or multiple processors included in a single device or distributed across multiple devices.

Figure 3:
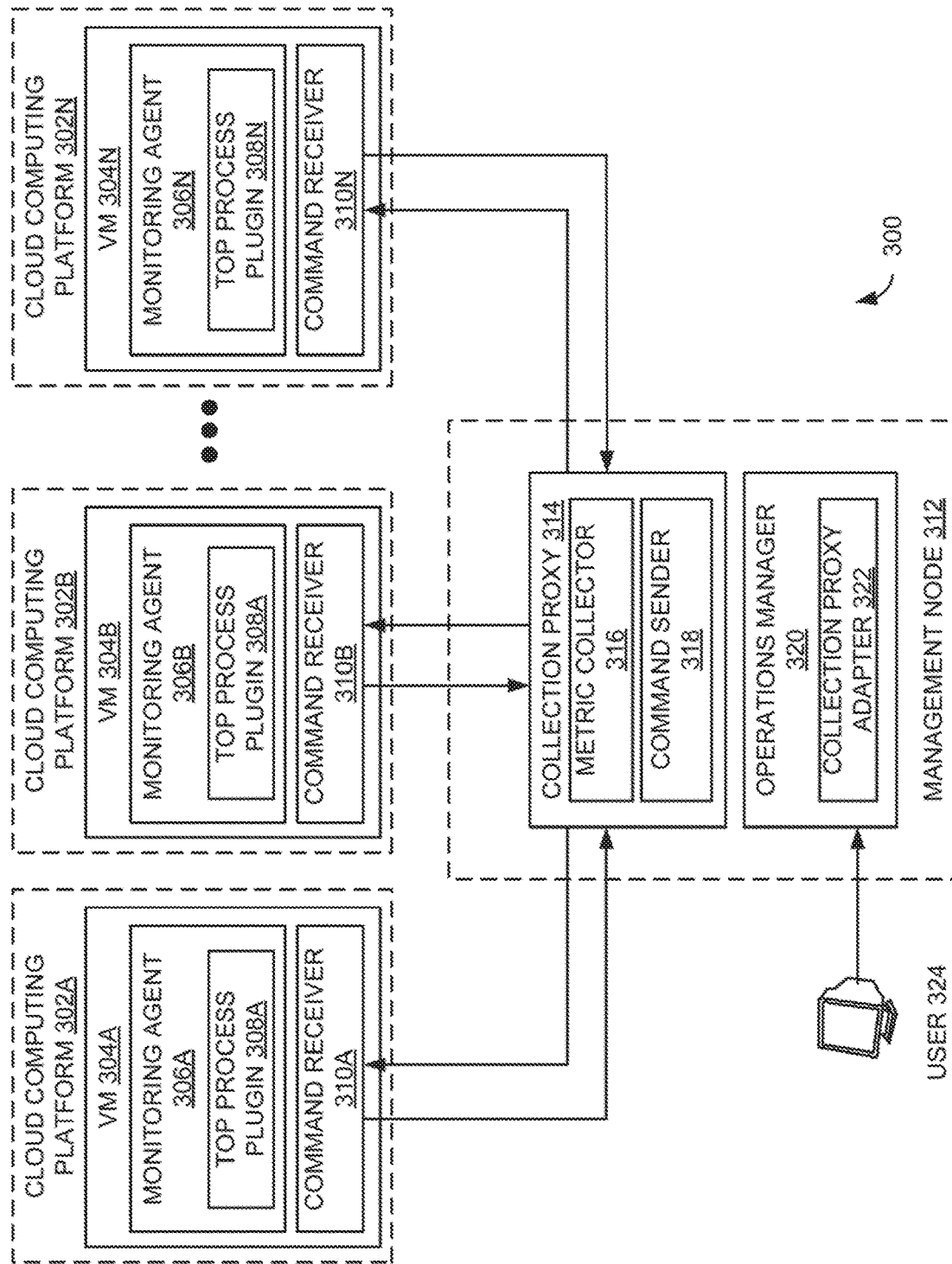
FIG. 3 is a block diagram of an example system illustrating a top process plugin to identify the top resource consuming processes on client nodes.

FIG 3 is a block diagram of an example system 300 illustrating a top process plugin 308 to identify the top resource consuming processes on client nodes (e.g., VMs 304A-N). As shown in FIG. 3, system 300 may include a management node 312 and cloud computing environments (i.e., cloud computing platforms 302A-N) that are in communication with management node 312. Management node 312 may refer to a computing device, or computer program (i.e., executing on a computing device), that provides some service to client nodes (e.g., 304A-N) of cloud computing platforms 302A-N. Management node 312 may connect to cloud computing platforms 302A-N either directly or over network (e.g., over a local-area network, wide-area network, wireless network, or the like).

As shown in FIG. 3, system 300 may support multiple cloud computing environments (i.e., cloud computing platforms 302A-N), available to multiple enterprises in single-tenant and multi-tenant configurations. In one example, cloud computing platforms 302A-N may be provided by different cloud service providers. For example, cloud computing platform 302 may include, but not limited to, Amazon Web Services (AWS), Google Cloud Platform, Windows Azure, OpenStack, or any other cloud computing platform.

In some examples, one or more of VMs 304A-N may be deployed within each of cloud computing platforms 302A-N to provide infrastructure services, IT management services, and other infrastructure-related functions to tenants. Further, VMs 304A-N running on different cloud computing platforms 302A-N may be centrally managed by management node 312. Even though FIG. 3 depicts one VM 304 running in each cloud computing platform 302, in some examples, multiple VMs can be deployed in each cloud computing platform 302.

For example, in cross cloud computing platforms, where different VMs run on various types/flavors/versions of OS, the data (e.g., unformatted data) sent across may be in proprietary format, thereby leading to an additional task of collating and sorting at the server. The overhead of additional collating and sorting on the server can make the server inefficient as there can be several VMs communicating to the server, thereby creating a bottleneck at the server.

Examples described herein may provide monitoring agents 306A-N and associated top process plugins 308A-N on client-side to optimize and then transmit the optimized performance data to management node 312 (i.e., a server). During operation, monitoring agents 306A-N may fetch resource utilization data from VMs 304A-N, optimize the resource utilization data, and send the optimized resource utilization data to management node 312.

In one example, management node 312 may include a collection proxy 314 and an operations manager 320. Collection proxy 314 may include a command sender 318 to send a request to one or more VMs 304A-N for top "N" number of processes (e.g., top 5 processes) that consume high resource utilization. Further, VMs 304A-N may include command receivers 310A-N (e.g., receiving units 204A-N of FIG. 2) to receive the request from command sender 318 and run/trigger associated top process plugins 308A-N residing therein. Top process plugins 308A-N may determine and send the top "N" resource consuming processes on each of corresponding VMs 304A-N as follows:

1. For each process, fetch the resource utilization data for each resource (e.g., CPU, memory, I/O, and/or the like).
2. Filter the resource utilization data to determine a list of resources having resource utilizations greater than a predefined threshold (e.g., >Zero).
3. Rank each of the processes in the list corresponding to each resource.
    a. For example, rank each of the processes in the list until the "N" number based on CPU usage, rank each of the processes in the list until the "N" number based on memory usage, rank each of the processes in the list until the "N" number based on I/O usage, and so on.
4. Filter to the "N" number of processes (e.g., top 5 processes) corresponding to each resource as requested by management node 312.
5. Consolidate/combine the filtered data associated with all the resources (e.g., CPU, memory, and I/O) by removing any redundancy/duplicate entries (i.e., processes), for instance, the union of all the resources by removing any entry (i.e., process) which might appear twice or thrice.
    a. For example, a process "A" may appear as rank 3 for CPU and rank 5 for memory. In this case, only one entry for the process "A" with both the consolidated ranks can be sent to management node 312.
6. Send the consolidated data to management node 312 to either display or persist.

Further, collection proxy 314 may include metrics collector 316 to receive the consolidated data and display the required field as per user's preference. For example, if user 324 is interested in CPU, operations manager 320 can display the CPU data. In some examples, user 324 may access/login to management node 312 through an interface (e.g., collection proxy adapter 322 that is provided by operations manager 320). In some examples, user 324 may login to operations manager 320 through a web user interface.

Thus, no additional processing is required on management node 312. If the data is persisted, then the format can be retained as is and persisted to the disk. When requested, the persisted data may be retrieved and displayed as requested by user 324 for the required resource (e.g., CPU, memory, IO, and/or the like).

In one example, monitoring agents 306A-N, top process plugins 308A-N, and command receivers 310A-N of VMs 304A-N and collection proxy 314 and operations manager 320 of management node 312 may be implemented as engines or modules comprising any combination of hardware, firmware, and programming to implement the functionalities described herein.

Examples described herein may be implemented in client-server systems where significant amount of data gets exchanged between client nodes (e.g., 102A-N of FIG. 1, 202A-N of FIG. 2, and 304A-N of FIG. 3) and server (e.g., management node 104 of FIG. 1, management node 216 of FIG. 2, and management node 312 of FIG. 3). For example, operations manager 320 may be a vRealize™ Operations Manager (vROPS), Log Insight™, vRealize Automation®, vRealize Business, and/or Hyperic® that are offered by VMware. Examples described herein can be implemented in software as a service (SAAS), where the server communicating with multiple client nodes/agents/probes/slaves could receive unformatted data and may weaken the server.

An example implementation in vROPS may include:
1. User may login into VROps and navigate as follows: Administration->Configuration->Inventory Explorer->Virtual Machine->Select a VM for which Top process plugin need to be enabled.
2. User may enable/disable top process plugin on demand. Details->Actions->Enable Top Process Plugin.
3. The command receiver 310A-N in the client nodes (e.g., VMs 304A-N) may enable the top process plugin and the plugin collects the resource utilization data associated with the processes running therein.
4. The top process plugin 304A-N may fetch the data, sort the data based on CPU, memory, and disk I/O resource utilizations, rank each process for all the resources, and send the report to collection proxy 314 through a data channel.
5. The vROPS may persist the data sent for later viewing of the data by the user.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to an particular routine, module, component, or the like.

Example Processes

Figure 4:
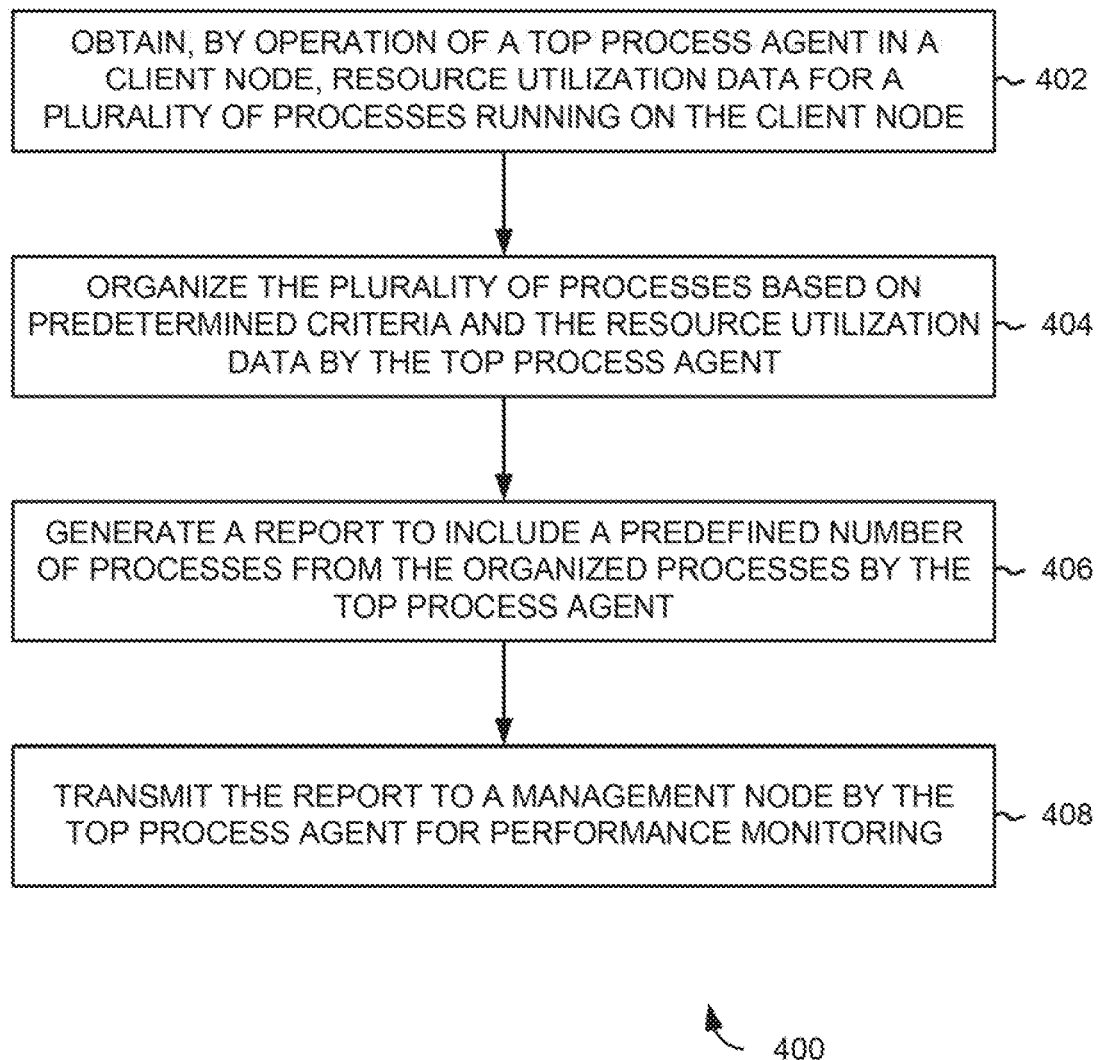
FIG. 4 is an example flow diagram illustrating a client-side implementation of client-server communications to identify top resource consuming processes on client-nodes.

FIG. 4 is an example flow diagram 400 illustrating a client-side implementation of client-server communications to identify top resource consuming processes on client-nodes. It should be understood that the process depicted in FIG. 4 represents generalized illustrations, and that other processes may be added, or existing processes may be removed, modified, or rearranged without departing from the scope and spirit of the present application, in addition, it should be understood that the processes may represent instructions stored on a computer-readable storage medium that, when executed, may cause a processor to respond, to perform actions, to change states, and/or to make decisions.

Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 402, resource utilization data for a plurality of processes running on the client node may be obtained by operation of a top process agent in a client node. The client node may be running in the cloud computing system. Example client node may be selected from a group consisting of a physical computing device, a virtual machine, a physical gateway device, and a gateway device. Example resource utilization data may be selected from a group consisting of CPU utilization, memory utilization, input/output (I/O) usage, cache usage, and network bandwidth usage.

In some examples, the operation of the top process agent may be triggered by the management node at periodic time intervals, at predefined intervals as set by an administrator, or based on a request from the administrator. At 404, the plurality of processes may be organized based on predetermined criteria and the resource utilization data by the top process agent. In one example, the resource utilization data may be filtered to generate a list of processes having resource utilization for each resource greater than a threshold. Further, the list of processes may be sorted based on the resource utilization data. Furthermore, the sorted list of processes may be ranked until the predefined number by the top process agent starting from a process with a high resource utilization.

At 406, a report to include a predefined number of processes from the organized processes may be generated by the top process agent. In one example, the predefined number may include a top "N" number of processes that consume high resource utilization corresponding to each resource. For example, the report to include the predefined number of processes may be generated starting from the process with the high resource utilization based on the ranking. In one example, the report including the predefined number of processes may be generated in an OS agnostic manner.

At 408, the report may be transmitted to a management node by the top process agent tor performance monitoring. For example, consider that the output from two processes with process identifiers (PIDs) 2011 and 4011 are the top "N" processes on a particular client node of interest. The processes may be ranked for the memory, CPU and disk I/O resources as follows:
  a. The process with PID 2011 may be:
    1. Ranked 1 in CPU consumption
    2. Ranked 2 in Memory consumption
    3. Ranked 31 in I/O consumption
  b. The process with PID 4011 may be:
    1. Ranked 112 in CPU consumption
    2. Ranked 84 in Memory consumption
    3. Ranked 4 in I/O consumption In this example, the report may be generated in the following data format/model:
{"topprocesses":[{
"pid": "2011"
"cpu_usage": "90"
"mem_usage": "80"
"disk_usage": "60"
"topMemOrder": "2"
"topCpuOrder": "1"
"topDiskIOOrder": "31"},
{"pid": "4011"
"cpu_usage": "10"
"mem_usage": "2"
"disk_usage": "600"
"topMemOrder": "84"
"topCpuOrder": "112"
"topDiskIOOrder": "3"}]}

Consider an example where there are processes which may be in top 10 for CPU, memory, and I/O resource consumption. On management node, for a VM of interest, the user can request for the top 10 processes, consuming CPU, memory, and I/O. If there is a process which is in top 10 on all the CPU, memory and I/O resource consumption, then only one entry corresponding to the process may be sent to the management node. In this example, consolidated data may be generated by intersection of the data for all the CPU, memory and I/O resources, pulling the common data for the given process, and the addition of ranks for all the resources.

The sample report format can be as follows—
{"topprocesses":[{
"pid": "202"
"cpu_usage": "90"
"mem_usage": "80"
"disk_usage": "60"
"topMemOrder": "2"
"topCpuOrder": "1"
"topDiskIOOrder": "3"}]}

As the process is ranked for all the three resources, the data model to send the data across over network can be optimized. This can reduce the data sent over the network to the management node, thereby reducing the network usage and also reducing the overhead on the management node.

Consider another example where there are processes which may be in top 10 for two resource consumption. On management node, for a VM of interest, the user can request for the top 10 processes, consuming CPU, memory, and I/O. If there is a process which is in top 10 on the CPU and memory consumption, then only one entry corresponding to the process may be sent to the management node. In the below example, PID 102 may be in top 10 for memory and CPU consumption and PID 402 may be in top 10 for CPU and disk I/O order.

The sample report format is as follows:
{"topprocesses":[{
"pid": "102"
"cpu_usage": "90"
"mem_usage": "80"
"disk_usage": "60"
"topMemOrder": "2"
"topCpuOrder": "1"
"topDiskIOOrder": "30"},
}
"pid": "402"
"cpu_usage": "10"
"mem_usage": "20"
"disk_usage": "50"
"topMemOrder": "19"
"topCpuOrder": "7"
"topDiskIOOrder": "3"}]}

Consider yet another example, where there is a unique process which is in top 10 for only one resource consumption (i.e., no overlaps in resource consumption for all resources). On management node, for a VM of interest, the user can request for the top 10 processes, consuming CPU, memory, and I/O. If there is a process which is in top 10 on one resource consumption, then the union of all the processes, which fall in top 10 may be sent to the management node.

The sample report format is as follows—
{"topprocesses":[{
"pid"; "12"
"cpu_usage": "90"
"mem_usage": "10"
"disk_usage": "12"
"topMemOrder": "12"
"topCpuOrder": "1"
"topDiskIOOrder": "30"},
{
"pid": "402"
"cpu_usage": "10"
"mem_usage": "20"
"disk_usage": "50"
"topMemOrder": "19"
"topCpuOrder": "7"
"topDiskIOOrder": "3"},
"pid": "802"
"cpu_usage": "10"
"mem_usage": "60"
"disk_usage": "10"
"topMemOrder": "9"
"topCpuOrder": "7"
"topDiskIOOrder": "3"}]}

Figure 5:
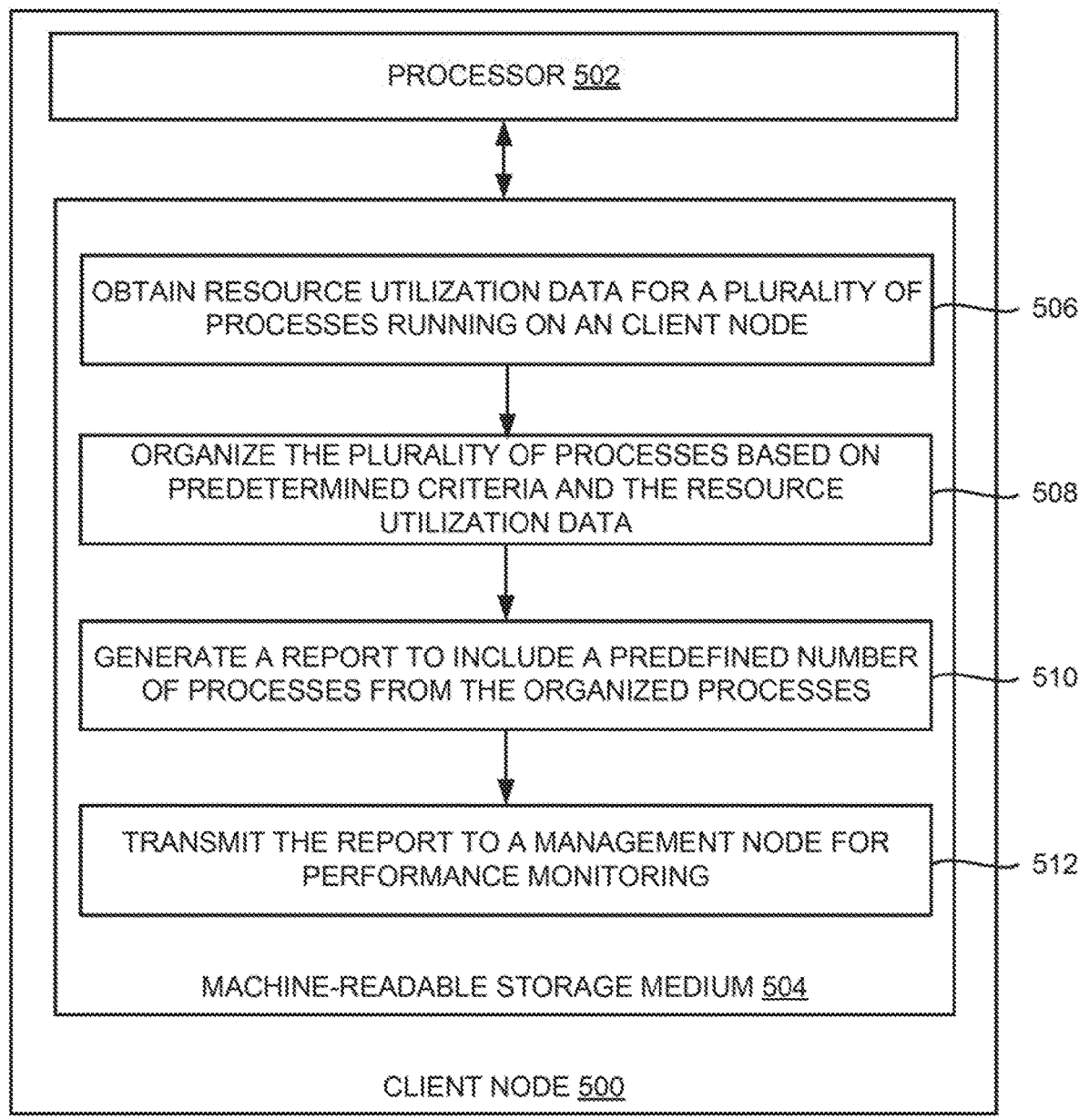
FIG. 5 is a block diagram of an example client node including non-transitory computer-readable storage medium, storing instructions to optimize and transmit performance data to a management node.

FIG. 5 is a block diagram of an example client node 500 (e.g., client node 102 of FIG. 1, client node 202 of FIG. 2 or VM 304 of FIG. 3) including non-transitory computer-readable storage medium storing instructions to optimize and transmit performance data to a management node. The client node 500 may include a processor 502 and a machine-readable storage medium 504 communicatively coupled through a system bus. The processor 502 may be any type of central processing unit (CPU), microprocessor, or processing logic that interprets and executes machine-readable instructions stored in the machine-readable storage medium 504. The machine-readable storage medium 504 may be a random-access memory (RAM) or another type of dynamic storage device that may store information and machine-readable instructions that may be executed by the processor 502. For example, the machine-readable storage medium 504 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 504 may be a non-transitory machine-readable medium. In an example, the machine-readable storage medium 504 may be remote but accessible to client node 500.

The machine-readable storage medium 504 may store instructions 506-512. In an example, instructions 506-512 may be executed by processor 502 for optimizing performance monitoring of client nodes in client-server communications. Instructions 506 may be executed by processor 502 to obtain resource utilization data for a plurality of processes running on a client node. In one example, the client node may be running in the client-server environment such as a cloud computing system.

Instructions 508 may be executed by processor 502 to organize the plurality of processes based to predetermined criteria and the resource utilization data. In one example, the plurality of processes may be organized by filtering the resource utilization data to generate a list of processes having resource utilization for each resource greater than a threshold, sorting the list of processes based on the resource utilization data, and ranking the sorted list of processes until the predefined number by the top process agent starting from a process with a high resource utilization.

Instructions 510 may be executed by processor 502 to generate a report to include a predefined number of processes (e.g., top number of processes that consume high resource utilization) from the organized processes. Instructions 512 may be executed by processor 502 to transmit the report to a management node for performance monitoring.

Thus, the data model may be optimized to send the top "N" processes that consume high CPU, memory and I/O usage over the network, thereby saving resource consumption on the server. Further, the overhead on the server can be significantly reduced as the server can have several client nodes (e.g., thousands of clients) that are sending the data. Further, the report communicated from the client nodes may be vendor and/or OS agnostic, which can reduce additional sorting on the server side. The data model can be extended to any additional resources such as process threads (e.g., top 5 processes using high number of threads).

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution are for the purpose of illustration only, Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A client node in a client-server environment, comprising:
    at least one processing resource;
    a computer-readable storage medium having computer-readable program code embodied therewith, the computer-readable program code being configured to:
        obtain resource utilization data associated with a plurality of processes running on the client node;
        determine a list of processes having resource utilization greater than a threshold based on the resource utilization data;
        organize the list of processes based on predetermined criteria and the resource utilization data;
        generate a report including a predefined number of processes from the organized list; and
        transmit the report to a management node for performance monitoring.

2. The client node of claim 1, wherein the predefined number comprises a top "N" number of processes that consume high resource utilization in the list of processes.

3. The client node of claim 1, wherein the computer readable program code being configured to:
    sort the list of processes based on the resource utilization;
    rank the sorted list of processes until the predefined number starting from a process with a high resource utilization; and
    generate the report including details associated with the predefined number of processes based on the ranked list of processes.

4. The client node of claim 1, wherein the resource utilization data is associated with a plurality of resources.

5. The client node of claim 4, wherein the computer-readable program code being configured to:
    consolidate data associated with the predefined number of processes for each of the plurality of resources by removing duplicate entries of the processes; and
    generate the report including the predefined number of processes for each of the plurality of resources based on the consolidated data.

6. The client node of claim 1, wherein the resource utilization data is associated with at least one resource, wherein the at least one resource is a hardware resource or a software resource.

7. The client node of claim 1, wherein the report including the predefined number of processes is generated in an operating system (OS) agnostic manner.

8. A cloud computing system comprising:
    a management node; and
    a plurality of client nodes communicatively coupled to the management node, wherein each client node comprises:
        a monitoring unit to fetch resource utilization data for a plurality of processes running on the client node, wherein the resource utilization data is associated with a plurality of resources;
        a structuring unit to organize the plurality of processes corresponding to each of the resources based on predetermined criteria and the resource utilization data;
        a report generation unit to generate a report including a predefined number of processes corresponding to each of the resources based on the organized processes; and
        a transmitting unit to transmit the report to the management node for performance monitoring.

9. The cloud computing system of claim 8, wherein the predefined number comprises a top "N" number of processes that consume high resource utilization corresponding to each of the resources.

10. The cloud computing system of claim 8, wherein each client node comprises a receiving unit to receive a request from the management node to determine the predefined number of processes having high resource utilization.

11. The cloud computing system of claim 8, wherein the structuring unit is to:
    filter the resource utilization data to generate a list of processes having resource utilization for each resource greater than a threshold;
    sort the list of processes for each of the resources based on the resource utilization; and
    rank the sorted list of processes for each of the resources until the predefined number starting from a process with a high resource utilization.

12. The cloud computing system of claim 8, wherein the report generation unit is to:
    consolidate data associated with the predefined number of processes for the plurality of resources by removing duplicate entries of the processes; and
    generate the report including the predefined number of processes based on the consolidated data.

13. The cloud computing system of claim 8, wherein the client nodes operate on different cloud computing environments or platforms, and wherein the client nodes are selected from a group consisting of a physical computing device, a virtual machine, a physical gateway device, and a virtual gateway device.

14. The cloud computing system of claim 8, wherein the report including the predefined number of processes is operating system (OS) agnostic.

15. The cloud computing system of claim 8, wherein the resource utilization data is selected from a group consisting of central processing unit (CPU) utilization, memory utilization, input/output (I/O) usage, cache usage, and network bandwidth usage.

16. A method for managing a cloud computing system, comprising:
    obtaining, by operation of a top process agent in a client node, resource utilization data for a plurality of processes running on the client node, wherein the client node is running in the cloud computing system;
    organizing the plurality of processes based on predetermined criteria and the resource utilization data by the top process agent;
    generating a report to include a predefined number of processes from the organized processes by the top process agent; and
    transmitting the report to a management node by the top process agent for performance monitoring.

17. The method of claim 16, wherein the predefined number comprises a top "N" number of processes that consume high resource utilization corresponding to each resource.

18. The method of claim 16, wherein organizing the plurality of processes comprises:
   filtering the resource utilization data to generate a list of processes having resource utilization for each resource greater than a threshold;
   sorting the list of processes based on the resource utilization data; and
   ranking the sorted list of processes until the predefined number by the top process agent starting from a process with a high resource utilization.

19. The method of claim 18, wherein generating the report to include the predefined number of processes, comprises:
   generating the report to include the predefined number of processes starting from the process with the high resource utilization based on the ranking.

20. The method of claim 16, wherein the client node is selected from a group consisting of a physical computing device, a virtual machine, a physical gateway device, and a gateway device, and wherein the resource utilization data is selected from a group consisting of CPU utilization, memory utilization, input/output (I/O) usage, cache usage, and network bandwidth usage.

21. The method of claim 16, wherein generating the report to include the predefined number of processes from the organized processes comprises:
   generating the report including the predefined number of processes in an operating system (OS) agnostic manner.

22. The method of claim 16, wherein the operation of the top process agent is triggered by the management node at periodic time intervals, at predefined intervals as set by an administrator, or based on a request from the administrator.

23. A non-transitory machine-readable storage medium encoded with instructions that, when executed by a processor, cause the processor to:
   obtain resource utilization data for a plurality of processes running on a client node, wherein the client node is running in a cloud computing system;
   organize the plurality of processes based on predetermined criteria and the resource utilization data;
   generate a report to include a predefined number of processes from the organized processes; and
   transmit the report to a management node for performance monitoring.

24. The non-transitory machine-readable storage medium of claim 23, wherein the predefined number comprises a top "N" number of processes that consume high resource utilization from the plurality of processes.

25. The non-transitory machine-readable storage medium of claim 23, wherein organizing the plurality of processes comprises:
   filtering the resource utilization data to generate a list of processes having resource utilization for each resource greater than a threshold;
   sorting the list of processes based on the resource utilization data; and
   ranking the sorted list of processes until the predefined number by the top process agent starting from a process with a high resource utilization.

* * * * *